(12) United States Patent
Wu

(10) Patent No.: US 11,758,372 B2
(45) Date of Patent: Sep. 12, 2023

(54) CHARGING POLICY OBTAINING METHOD AND APPARATUS

(71) Applicant: Huawei Technologies Co., Ltd., Shenzhen (CN)

(72) Inventor: Zhewen Wu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 256 days.

(21) Appl. No.: 17/345,976

(22) Filed: Jun. 11, 2021

(65) Prior Publication Data

US 2021/0306818 A1 Sep. 30, 2021

Related U.S. Application Data

(63) Continuation of application No. PCT/CN2019/124897, filed on Dec. 12, 2019.

(30) Foreign Application Priority Data

Dec. 14, 2018 (CN) .......................... 201811536073.7

(51) Int. Cl.
H04W 4/24 (2018.01)
H04L 12/14 (2006.01)
(Continued)

(52) U.S. Cl.
CPC ........... *H04W 4/24* (2013.01); *H04L 12/1407* (2013.01); *H04L 63/0892* (2013.01); *H04W 8/18* (2013.01); *H04W 12/06* (2013.01); *H04W 88/16* (2013.01)

(58) Field of Classification Search
CPC ......... H04W 4/24; H04W 8/18; H04W 12/06; H04W 88/16; H04L 12/1407;
(Continued)

(56) References Cited

U.S. PATENT DOCUMENTS 9,763,168 B1 9/2017 Zait et al.
10,015,771 B2 7/2018 Räsänen
(Continued)

FOREIGN PATENT DOCUMENTS

CN 101001156 A 7/2007
CN 101022347 A 8/2007
(Continued)

OTHER PUBLICATIONS

"3rd Generation Partnership Project; Technical Specification Group Core Network and Terminals; Policy and Charging Control (PCC); Reference points (Release 15)," 3GPP TS 29.212 V15.4.0, Total 142 pages, 3rd Generation Partnership Project, Valbonne, France (Sep. 2018).

(Continued)

*Primary Examiner* — Brandon J Miller
(74) *Attorney, Agent, or Firm* — Leydig, Voit & Mayer, Ltd.

(57) ABSTRACT

Embodiments of this application disclose a charging policy obtaining method and apparatus. The charging policy obtaining method may be used in a broadband network gateway, and specifically includes the following steps: receiving an authentication, authorization, and accounting request from user equipment, where the authentication, authorization, and accounting request includes a user name and a user equipment identifier; sending a charging policy request to a first server, where the charging policy request includes a first field and a second field, the first field is used to carry the user name, and the second field is used to carry the user equipment identifier; and receiving a charging policy response sent by the first server, where the charging policy response includes a charging policy corresponding to the user name and the user equipment identifier, and obtaining the charging policy from the charging policy response.

12 Claims, 2 Drawing Sheets

(51) Int. Cl.
*H04L 9/40* (2022.01)
*H04W 8/18* (2009.01)
*H04W 12/06* (2021.01)
*H04W 88/16* (2009.01)

(58) Field of Classification Search
CPC . H04L 63/0892; H04M 15/66; H04M 15/755; H04M 15/80; H04M 15/8011; H04M 15/8022; H04M 15/8066; H04M 15/83; H04M 15/85; H04M 15/854
See application file for complete search history.

(56) References Cited

U.S. PATENT DOCUMENTS

| | | | | |
|---|---|---|---|---|
| 2012/0030143 | A1* | 2/2012 | Chen | G06Q 30/00 705/400 |
| 2014/0189838 | A1* | 7/2014 | Zhao | H04L 63/083 726/3 |
| 2017/0180374 | A1* | 6/2017 | Gandhewar | H04L 63/0892 |

FOREIGN PATENT DOCUMENTS

| | | |
|---|---|---|
| CN | 101090325 A | 12/2007 |
| CN | 101106464 A | 1/2008 |
| CN | 101163000 A | 4/2008 |
| CN | 101998348 A | 3/2011 |
| CN | 102045176 A | 5/2011 |
| CN | 103533599 A | 1/2014 |
| CN | 105101136 A | 11/2015 |
| CN | 106533708 A | 3/2017 |
| WO | 2011140922 A1 | 11/2011 |
| WO | 2014048191 A1 | 4/2014 |

OTHER PUBLICATIONS

"Definition of AVPs for Announcement service," 3GPP TSG-SA5 Meeting #104, S5-156046 revision of S5-15xabc, Anaheim (US), Total 48 pages, 3rd Generation Partnership Project, Valbonne, France (Nov. 16-20, 2015).

Zhou "Introduction of Broadband User Access Authentication Technology (Part I)," Hunan Radio and Television Network Co., Ltd , Total 23 pages (2004).

Aboba et al., "The Network Access Identifier," Network Working Group, Request for Comments: 2486, pp. 1-8, The Internet Society (Jan. 1999).

Hakala et al., "Diameter Credit-Control Application," Network Working Group, Request for Comments: 4006, pp. 1-114, The Internet Society (Aug. 2005).

* cited by examiner

CHARGING POLICY OBTAINING METHOD AND APPARATUS

CROSS-REFERENCE TO RELATED APPLICATIONS

This application is a continuation of International Application No. PCT/CN2019/124897, filed on Dec. 12, 2019, which claims priority to Chinese Patent Application No. CN201811536073.7, filed on Dec. 14, 2018. The disclosures of the aforementioned applications are hereby incorporated by reference in their entireties.

TECHNICAL FIELD

This application relates to the field of network communications, and in particular, to a charging policy obtaining method and apparatus.

BACKGROUND

As technologies develop, a broadband network has become an increasingly indispensable technology in people's work and entertainment. When user equipment (UE) needs to access a broadband network, the user equipment needs to send a user name and a password to a broadband network gateway (BNG), so that the broadband network gateway performs authentication, authorization, and accounting based on the user name and the password.

Currently, in some charging scenarios, in addition to sending the user name to a server, the broadband network gateway needs to send a user equipment identifier to the server, to request the server to deliver a corresponding charging policy. In a conventional manner, the broadband network gateway concatenates the user name and the user equipment identifier to obtain a concatenated string, and sends, to the server, a charging policy request that carries the concatenated string. However, in this manner, the server may deliver an incorrect charging policy to the broadband network gateway because the server cannot accurately obtain a user-matched charging policy based on the concatenated string. Consequently, a loss is caused to the user or an operator.

SUMMARY

Embodiments of this application provide a charging policy obtaining method and apparatus, to obtain and deliver a user-matched charging policy.

According to a first aspect, an embodiment of this application provides a charging policy obtaining method. The method may be used in a broadband network gateway. The method includes the following steps: The broadband network gateway receives an authentication, authorization, and accounting (AAA) request from user equipment, where the authentication, authorization, and accounting request includes a user name and a user equipment identifier, and the user equipment identifier may include at least one of a circuit identifier (circuit ID) of the user equipment and a media access control (MAC) address of the user equipment. The broadband network gateway sends a charging policy request to a first server, where the charging policy request includes a first field and a second field, the first field is used to carry the user name, and the second field is used to carry the user equipment identifier. The broadband network gateway receives a charging policy response sent by the first server, where the charging policy response includes a charging policy that matches the user name and the user equipment identifier, and the broadband network gateway obtains the charging policy from the charging policy response.

In the foregoing method, the charging policy request is used to request the first server to deliver the charging policy corresponding to the user name and the user equipment identifier. The charging policy that matches the user name and the user equipment identifier means that the charging policy has a correspondence with the user name and the user equipment identifier.

In comparison with a conventional technology in which a user name and a user equipment identifier are concatenated and carried in one field, in this embodiment of this application, the user name and the user equipment identifier are carried in two fields in the charging policy request. In this way, the first server can extract the user name from the first field and the user equipment identifier from the second field in the charging policy request. In other words, the first server can distinguish the user name and the user equipment identifier, and can accurately obtain the corresponding charging policy based on the two parameters: the user name and the user equipment identifier.

Optionally, the charging policy request may be a credit control request (CCR). In this case, the first field may be a first attribute-value pair (AVP), and the second field may be a second attribute-value pair. An attribute of the first attribute-value pair is subscription identity data Subscription-Id-Data, and an attribute of the second attribute-value pair is a subscription identity group Subscription-Id-Group. Alternatively, an attribute of the first attribute-value pair is a subscription identity group Subscription-Id-Group, and an attribute of the second attribute-value pair is subscription identity data Subscription-Id-Data.

Optionally, to improve reliability of a broadband network service, the authentication, authorization, and accounting request further includes a password corresponding to the user name, and before the sending a charging policy request to a first server, the method further includes: The broadband network gateway sends an authentication and authorization request to a second server, where the authentication and authorization request includes the user name and the password; and the broadband network gateway receives an authentication and authorization response sent by the second server, where the authentication and authorization response includes a result of authentication and authorization that are performed based on the user name and the password.

The authentication and authorization request is used to request the second server to perform authentication and authorization based on the user name and the password. The second server stores a mapping relationship between a user name and a password. After receiving the authentication and authorization request, the second server determines whether the user name and the password in the authentication and authorization request are stored in the second server. If the user name and the password are stored in the second server, authentication and authorization succeed. If the user name and the password are not stored in the second server, authentication and authorization fail. The second server may send the result of authentication and authorization to the broadband network gateway. If the result of authentication and authorization indicates a success, the broadband network gateway may send the charging policy request to the first server. If the result of authentication and authorization indicates a failure, the broadband network gateway does not send the charging policy request to the first server.

According to a second aspect, an embodiment of this application further provides a charging policy obtaining apparatus. The apparatus includes: a first receiving unit, configured to receive an authentication, authorization, and accounting request from user equipment, where the authentication, authorization, and accounting request includes a user name and a user equipment identifier; a first sending unit, configured to send a charging policy request to a first server, where the charging policy request includes a first field and a second field, the first field is used to carry the user name, and the second field is used to carry the user equipment identifier; and a second receiving unit, configured to: receive a charging policy response sent by the first server, where the charging policy response includes a charging policy corresponding to the user name and the user equipment identifier, and obtain the charging policy from the charging policy response.

The charging policy request is used to request the first server to deliver the charging policy corresponding to the user name and the user equipment identifier. The charging policy obtaining apparatus may be disposed in a broadband network gateway.

Optionally, the charging policy request is a credit control request, the first field is a first attribute-value pair, and the second field is a second attribute-value pair.

Optionally, an attribute of the first attribute-value pair is subscription identity data, and an attribute of the second attribute-value pair is a subscription identity group.

Optionally, an attribute of the first attribute-value pair is a subscription identity group, and an attribute of the second attribute-value pair is subscription identity data.

Optionally, the user equipment identifier includes at least one of a circuit identifier (circuit ID) of the user equipment and a media access control (MAC) address of the user equipment.

Optionally, the authentication, authorization, and accounting request further includes a password corresponding to the user name. The apparatus further includes: a second sending unit, configured to send an authentication and authorization request to a second server before the first sending unit sends the charging policy request to the first server, where the authentication and authorization request includes the user name and the password; and a third receiving unit, configured to receive an authentication and authorization response sent by the second server, where the authentication and authorization response includes a result of authentication and authorization that are performed based on the user name and the password. The authentication and authorization request is used to request the second server to perform authentication and authorization based on the user name and the password.

DESCRIPTION OF EMBODIMENTS

Figure 1:
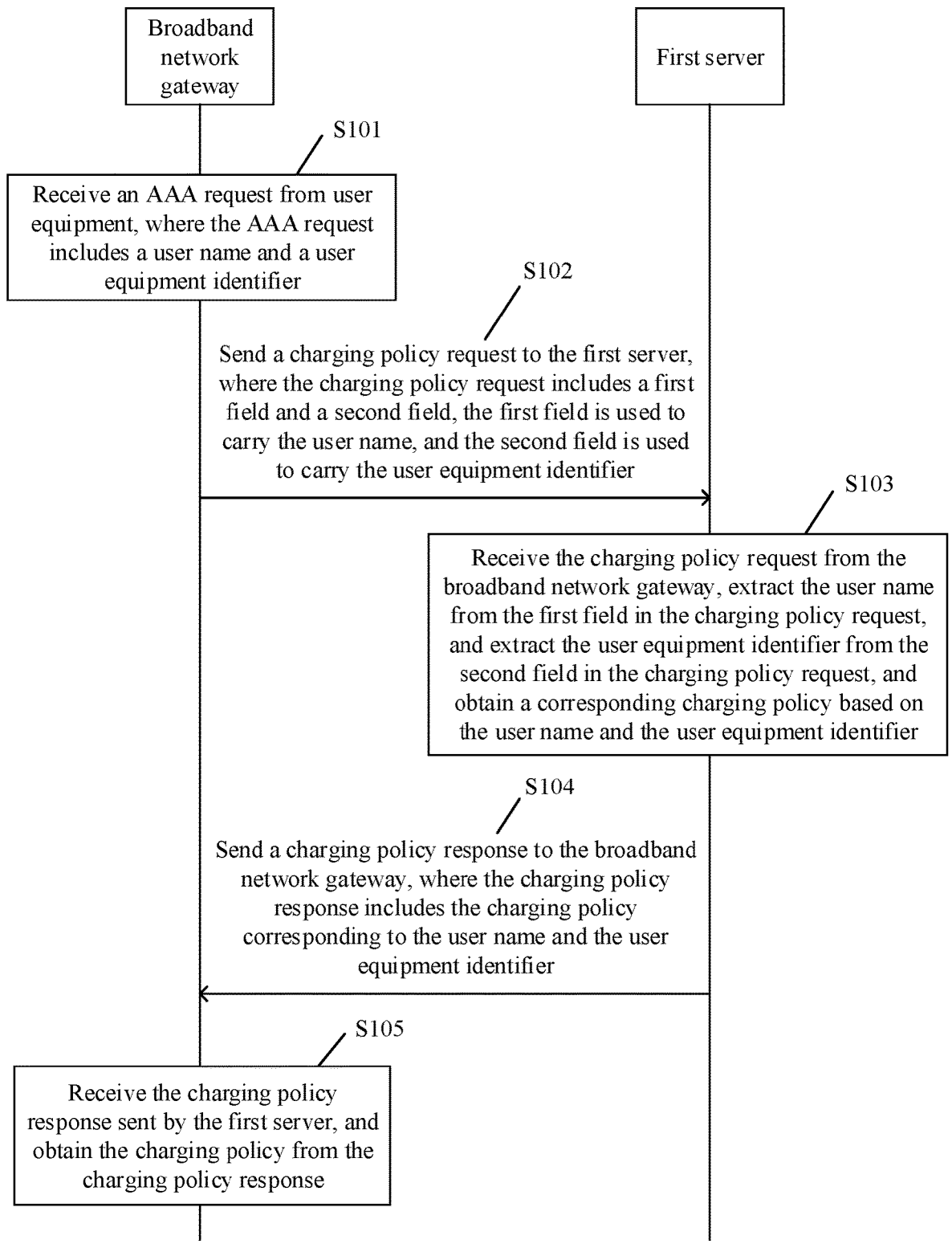
FIG. 1 is a signaling interaction diagram of a charging policy obtaining method according to an embodiment of this application.

In a conventional manner, after obtaining a user name and a user equipment identifier, a broadband network gateway concatenates the user name and the user equipment identifier to obtain a concatenated string, and sends, to a server, a charging policy request that carries the concatenated string, so that the server obtains a corresponding charging policy based on the string, and sends the charging policy to the broadband network gateway.

A disadvantage of this manner is that a same string may be obtained by concatenating different user names and user equipment identifiers. In this case, the server may obtain two or more charging policies based on the string. However, only one of the two or more charging policies, that is, a charging policy actually corresponding to the user name and the user equipment identifier, is correct. In this case, the server may send an incorrect charging policy to the broadband network gateway. Consequently, a loss is caused to a user or an operator.

For example, it is assumed that a user name 1 is ABC123, and a corresponding user equipment identifier 1 is 45; and a user name 2 is ABC12, and a corresponding user equipment identifier 2 is 345. A string 1 of ABC12345 is obtained by concatenating the user name 1 and the user equipment identifier 1, and a string 2 of ABC12345 is obtained by concatenating the user name 2 and the user equipment identifier 2. The server stores two charging policies. One charging policy corresponds to the user name 1 and the user equipment identifier 1, and the other charging policy corresponds to the user name 2 and the user equipment identifier 2. However, the server cannot determine, based on the string of ABC12345, which charging policy is required by the broadband network gateway, and may deliver an incorrect charging policy to the broadband network gateway.

To resolve the foregoing technical problem, embodiments of this application provide a charging policy obtaining method and apparatus, so that a broadband network gateway can obtain a correct charging policy.

FIG. 1 is a signaling interaction diagram of a charging policy obtaining method according to an embodiment of this application.

The charging policy obtaining method provided in this embodiment of this application is related to a broadband network gateway and a first server. The broadband network gateway is configured to send a charging policy request to the first server, where the charging policy request includes a user name and a user equipment identifier. The first server is configured to obtain a corresponding charging policy based on the user name and the user equipment identifier that are included in the charging policy request, and send the charging policy to the broadband network gateway. The first server may be a unified policy and charging controller (UPCC), or another type of server. This is not specifically limited in this application.

Specifically, the method may include the following steps.

S101: The broadband network gateway receives an AAA request from user equipment, where the AAA request includes the user name and the user equipment identifier.

In this embodiment of this application, the user equipment may be a mobile phone, a personal computer (PC), or a terminal such as a tablet personal computer (Tablet PC), a notebook computer, an ultra-mobile personal computer, or a personal digital assistant. In this embodiment of this application, the user equipment may be a device that supports a point-to-point protocol over Ethernet (PPPoE) or an internet protocol over Ethernet (IPoE).

Generally, the user name is set by a user. In addition to the user name, a password is also set by the user.

The user equipment identifier may include a circuit ID, a MAC address of the user equipment, and/or the like. The circuit identifier is used to identify circuit information of the user equipment. Different user equipments may correspond to a same circuit identifier or different circuit identifiers, and different user equipments correspond to different MAC addresses.

In this embodiment of this application, the broadband network gateway receives the AAA request from the user equipment. The AAA request may be carried in a dynamic host configuration protocol (DHCP) packet, a point-to-point protocol (PPP) packet, or a PPPoE active discovery initiation (PADI) packet.

That the broadband network gateway receives the AAA request from the user equipment may be that the user equipment sends the AAA request to a controlled cable modem (CCM) or an optical line terminal (OLT) and then the controlled cable modem or the optical line terminal sends the AAA request to the broadband network gateway. In some application scenarios, the user equipment and the controlled cable modem may be collectively referred to as customer-premises equipment (CPE).

When the user equipment identifier includes the circuit identifier, the AAA request sent by the user equipment to the controlled cable modem or the optical line terminal includes the user name and the password. After receiving the AAA request, the controlled cable modem or the optical line terminal generates a circuit identifier corresponding to the user name, adds a field in the AAA request, and uses the circuit identifier as a value in the field. Then, the controlled cable modem or the optical line terminal sends an AAA request with the added field to the broadband network gateway. The field added by the controlled cable modem in the AAA request may be a relay agent information option (Option82 for short) field. The field added by the optical line terminal in the first AAA request may be a tag field. The AAA request received by the controlled cable modem may be carried in a DHCP packet. The AAA request received by the optical line terminal may be carried in a PADI packet.

When the user equipment identifier includes the MAC address, the AAA request sent by the user equipment to the controlled cable modem or the optical line terminal includes the user name, the password, and the MAC address of the user equipment. After receiving the AAA request, the controlled cable modem or the optical line terminal forwards the AAA request to the broadband network gateway.

After receiving the AAA request, the broadband network gateway may parse the AAA request to obtain the user name, the password, and the user equipment identifier.

S102: The broadband network gateway sends the charging policy request to the first server, where the charging policy request includes a first field and a second field, the first field is used to carry the user name, and the second field is used to carry the user equipment identifier.

In this embodiment of this application, the charging policy request is a request used to obtain, from the first server, the charging policy corresponding to the user name and the user equipment identifier. In comparison with a conventional technology in which a user name and a user equipment identifier are concatenated and carried in one field, in the charging policy request, the user name and the user equipment identifier are carried in two fields. In this way, the first server can extract the user name from the first field and the user equipment identifier from the second field in the charging policy request, and can accurately obtain the corresponding charging policy based on the user name and the user equipment identifier.

In a diameter protocol, the charging policy request may be a credit control request. In the credit control request, a field may be referred to as an attribute-value pair. Therefore, the first field may be a first attribute-value pair, and the second field may be a second attribute-value pair. In other words, the user name may be a value of the first attribute-value pair, and the user equipment identifier may be a value of the second attribute-value pair.

For example, an attribute of the first attribute-value pair may be subscription identity data Subscription-Id-Data, and an attribute of the second attribute-value pair may be a subscription identity group Subscription-Id-Group. Alternatively, an attribute of the first attribute-value pair is a subscription identity group Subscription-Id-Group, and an attribute of the second attribute-value pair is subscription identity data Subscription-Id-Data. The attribute Subscription-Id-Data complies with a diameter credit control application (DCCA) protocol extended based on the basic diameter protocol. This protocol defines a real-time charging protocol framework. For details, refer to section 8.46 in RFC 4006. The Subscription-Id-Group included in the credit control request is a newly added attribute in this application. Certainly, it may be understood that using the Subscription-Id-Data and the Subscription-Id-Group as the attributes of the attribute-value pairs does not constitute a limitation on this application. Persons skilled in the art may make a selection based on an actual situation.

The foregoing example is still used as an example. It is assumed that a user name 1 is ABC123, and a corresponding user equipment identifier 1 is 45; and a user name 2 is ABC12, and a corresponding user equipment identifier 2 is 345. In a credit control request 1 sent by the broadband network gateway to the first server, a value corresponding to an attribute Subscription-Id-Group may be 45, and a value corresponding to an attribute Subscription-Id-Data may be ABC123. In a credit control request 2 sent by the broadband network gateway to the first server, a value corresponding to an attribute Subscription-Id-Group may be 345, and a value corresponding to an attribute Subscription-Id-Data may be ABC12.

Certainly, it may be understood that the method provided in this embodiment of this application is not limited to being used in the diameter protocol. In addition to the credit control request, the charging policy request may be another type of request used to obtain a charging policy. This is not specifically limited in this embodiment of this application.

S103: The first server receives the charging policy request from the broadband network gateway, extracts the user name from the first field in the charging policy request, extracts the user equipment identifier from the second field in the charging policy request, and obtains the corresponding charging policy based on the user name and the user equipment identifier.

The foregoing example is still used as an example. After receiving the credit control request 1, the first server may obtain the user equipment identifier of 45 from the attribute-value pair corresponding to the Subscription-Id-Group, and obtain the user name of ABC123 from the attribute-value pair corresponding to the Subscription-Id-Data, and may accurately find a corresponding charging policy based on the user name of ABC123 and the user equipment identifier of 45. Likewise, after receiving the credit control request 2, the first server may obtain the user equipment identifier of 345 from the attribute-value pair corresponding to the Subscription-Id-Group, and obtain the user name of ABC12 from the attribute-value pair corresponding to the Subscription-Id-Data, and may accurately find a corresponding charging policy based on the user name of ABC12 and the user equipment identifier of 345.

It can be learned that, in comparison with a conventional technical solution in which an incorrect charging policy may be delivered because whether ABC12345 that is obtained by concatenating the user name and the user equipment identifier actually represents the user name of ABC123 and the user equipment identifier of 45, or the user name of ABC12 and the user equipment identifier 345 cannot be distinguished, in this embodiment of this application, the charging policy that matches the user can be obtained and delivered.

S104: The first server sends a charging policy response to the broadband network gateway, where the charging policy response includes the charging policy corresponding to the user name and the user equipment identifier.

After obtaining the charging policy corresponding to the user name and the user equipment identifier, the first server may send the charging policy response to the broadband network gateway, where the charging policy response includes the charging policy.

In the diameter protocol, the charging policy response may be a credit control answer (CCA). Certainly, it may be understood that the method provided in this embodiment of this application is not limited to being used in the diameter protocol. In addition to the credit control answer, the charging policy response may be another type of answer used to send a charging policy to the broadband network gateway. This is not specifically limited in this embodiment of this application.

S105: The broadband network gateway receives the charging policy response sent by the first server, and obtains, from the charging policy response, the charging policy corresponding to the user name and the user equipment identifier.

In addition, in an actual application, to improve reliability of a broadband network service, before sending the charging policy request to the first server, the broadband network gateway may send an authentication and authorization request to a second server, where the authentication and authorization request includes the user name and the password in the AAA request, so that the second server can perform authentication and authorization based on the user name and the password. Specifically, the second server stores a mapping relationship between a user name and a password. After receiving the authentication and authorization request, the second server determines whether the user name and the password in the authentication and authorization request are stored in the second server. If the user name and the password are stored in the second server, authentication and authorization succeed. If the user name and the password are not stored in the second server, authentication and authorization fail.

The second server may send an authentication and authorization response to the broadband network gateway, where the authentication and authorization response includes a result of authentication and authorization that are performed based on the user name and the password. If the result of authentication and authorization indicates a success, the broadband network gateway may send the charging policy request to the first server. If the result of authentication and authorization indicates a failure, the broadband network gateway does not send the charging policy request to the first server.

Optionally, the second server may be a server that supports remote authentication dial in user service (RADIUS). In an actual application, the first server and the second server may be a same server, or may be different servers.

Figure 2:
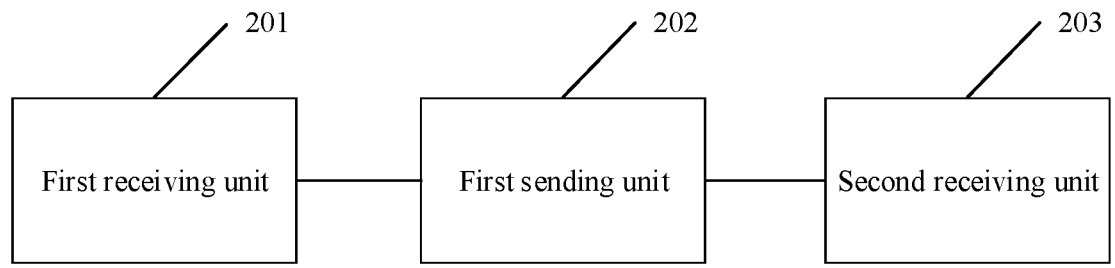
FIG. 2 is a structural block diagram of a charging policy obtaining apparatus according to an embodiment of this application.

FIG. 2 is a structural block diagram of a charging policy obtaining apparatus according to an embodiment of this application. Correspondingly, an embodiment of this application further provides a charging policy obtaining apparatus used in a broadband network gateway. The broadband network gateway may implement a function of the broadband network gateway in the embodiment shown in FIG. 1. The broadband network gateway includes a first receiving unit 201, a first sending unit 202, and a second receiving unit 203. The first receiving unit 201 is configured to perform S101 in the embodiment shown in FIG. 1; the first sending unit 202 is configured to perform S102 in the embodiment shown in FIG. 1; and the second receiving unit 203 is configured to perform S105 in the embodiment shown in FIG. 1.

Specifically, the first receiving unit 201 is configured to receive an authentication, authorization, and accounting request from user equipment, where the authentication, authorization, and accounting request includes a user name and a user equipment identifier.

The first sending unit 202 is configured to send a charging policy request to a first server, where the charging policy request includes a first field and a second field, the first field is used to carry the user name, and the second field is used to carry the user equipment identifier.

The second receiving unit 203 is configured to: receive a charging policy response sent by the first server, where the charging policy response includes a charging policy corresponding to the user name and the user equipment identifier, and obtain the charging policy from the charging policy response.

In comparison with a conventional technology in which a user name and a user equipment identifier are concatenated and carried in one field, in this embodiment of this application, the user name and the user equipment identifier are carried in two fields in the charging policy request. In this way, the first server can extract the user name from the first field and the user equipment identifier from the second field in the charging policy request. In other words, the first server can distinguish the user name and the user equipment identifier, and can accurately obtain the corresponding charging policy based on the user name and the user equipment identifier.

Optionally, the charging policy request is a credit control request, the first field is a first attribute-value pair, and the second field is a second attribute-value pair.

Optionally, the first attribute-value pair is subscription identity data Subscription-Id-Data, and the second attribute-value pair is a subscription identity group Subscription-Id-Group. Alternatively, the first attribute-value pair is a subscription identity group Subscription-Id-Group, and the second attribute-value pair is subscription identity data Subscription-Id-Data.

Optionally, the user equipment identifier may include at least one of a circuit identifier circuit ID of the user equipment and a MAC address of the user equipment.

Optionally, the authentication, authorization, and accounting request further includes a password corresponding to the user name. The apparatus further includes: a second sending unit, configured to send an authentication and authorization request to a second server before the first sending unit sends the charging policy request to the first server, where the authentication and authorization request includes the user name and the password; and a third receiving unit, configured to receive an authentication and authorization response sent by the second server, where the authentication and authorization response includes a result of authentication and authorization that are performed based on the user name and the password.

Figure 3:
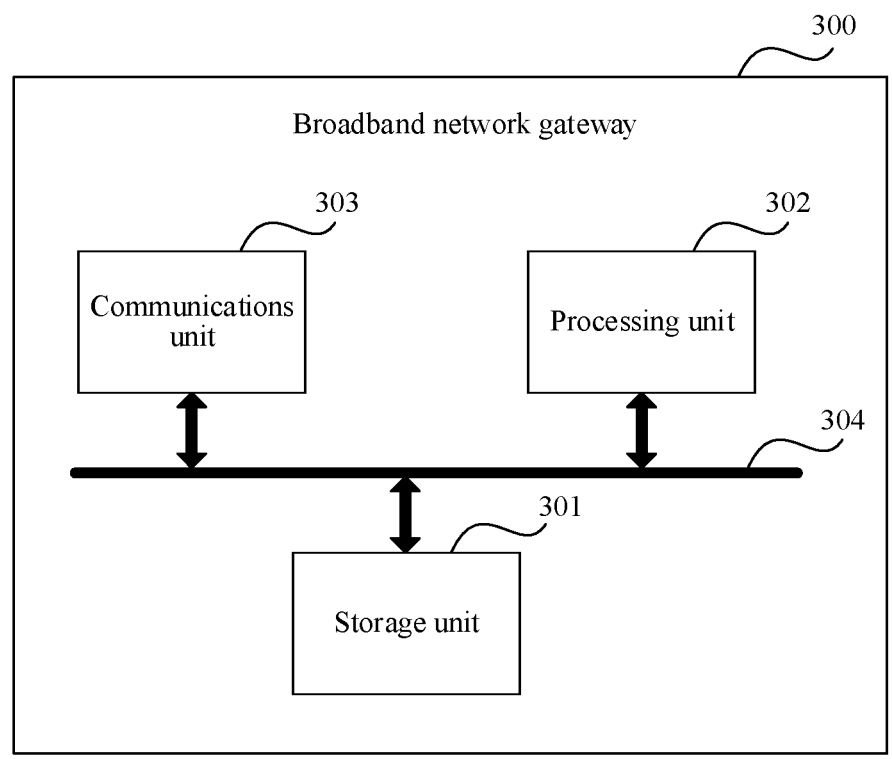
FIG. 3 is an architectural diagram of hardware of a broadband network gateway according to an embodiment of this application.

As shown in FIG. 3, an embodiment of this application further provides a broadband network gateway 300. The broadband network gateway 300 may implement a function of the broadband network gateway in the embodiment shown in FIG. 1. The broadband network gateway 300 includes a storage unit 301, a processing unit 302, and a communications unit 303.

The storage unit 301 is configured to store an instruction.

The processing unit 302 is configured to execute the instruction in storage unit 301, to perform the charging policy obtaining method used in the broadband network gateway in the embodiment shown in FIG. 1.

The communications unit 303 is configured to communicate with a first server.

The storage unit 301, the processing unit 302, and the communications unit 303 are connected to each other through a bus 304. The bus 304 may be a peripheral component interconnect (PCI for short) bus, an extended industry standard architecture (EISA for short) bus, or the like. The bus may be classified into an address bus, a data bus, a control bus, and the like. For ease of representation, only one thick line is used to represent the bus in FIG. 3, but this does not mean that there is only one bus or only one type of bus.

The storage unit 301 may be a random access memory (RAM), a flash memory, a read-only memory (ROM), an erasable programmable read-only memory (EPROM), an electrically erasable programmable read-only memory (EEPROM), a register, a hard disk, a removable hard disk, a CD-ROM, or a storage medium of any other form known to persons skilled in the art.

For example, the processing unit 302 may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing unit 302 may implement or execute various example logical blocks, modules, and circuits described with reference to content disclosed in this application. Alternatively, the processing unit 302 may be a combination of processors implementing a computing function, for example, a combination of one or more microprocessors, or a combination of a DSP and a microprocessor.

The communications unit 303 may be, for example, an interface card, or may be an Ethernet interface or an asynchronous transfer mode (ATM) interface.

An embodiment of this application further provides a computer-readable storage medium including an instruction. When the instruction is run on a computer, the computer is enabled to perform the charging policy obtaining method used in the broadband network gateway.

An embodiment of this application further provides a charging policy obtaining system. The system includes the broadband network gateway and the first server that are provided in the embodiment shown in FIG. 1.

In the specification, claims, and accompanying drawings of this application, the terms "first", "second", "third", "fourth", and the like (if used) are intended to distinguish between similar objects but do not necessarily indicate a specific order or sequence. It should be understood that data termed in such a way are interchangeable in proper circumstances so that the embodiments described herein can be implemented in other orders than the order illustrated or described herein. Moreover, the terms "include", "have", and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

It may be clearly understood by persons skilled in the art that, for convenient and brief description, for a detailed working process of the foregoing system, apparatus, and unit, reference may be made to a corresponding process in the foregoing method embodiment, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the method described in the embodiments of this application. The foregoing storage medium includes any medium that can store program code, for example, a USB flash drive, a removable hard disk, a read-only memory (ROM), a random access memory (RAM), a magnetic disk, or an optical disc.

Persons skilled in the art should be aware that in the foregoing one or more examples, functions described in the present disclosure may be implemented by hardware, software, firmware, or any combination thereof. When the functions are implemented by software, these functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose computer or a dedicated computer.

In the foregoing specific implementations, the objectives, technical solutions, and benefits of the present disclosure are further described in detail. It should be understood that the foregoing descriptions are merely specific implementations of the present disclosure.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A charging policy obtaining method, wherein the method is used in a broadband network gateway, and comprises:
   receiving an authentication, authorization, and accounting request from a user equipment, wherein the authentication, authorization, and accounting request comprises a user name and a user equipment identifier;
   sending a charging policy request to a first server, wherein the charging policy request comprises a first field and a second field, the first field is used to carry the user name, and the second field is used to carry the user equipment identifier; and
   receiving a charging policy response sent by the first server, wherein the charging policy response comprises a charging policy corresponding to the user name and the user equipment identifier, and obtaining the charging policy from the charging policy response.

2. The method according to claim 1, wherein the charging policy request is a credit control request, the first field is a first attribute-value pair, and the second field is a second attribute-value pair.

3. The method according to claim 2, wherein an attribute of the first attribute-value pair is subscription identity data (Subscription-Id-Data), and an attribute of the second attribute-value pair is a subscription identity group (Subscription-Id-Group).

4. The method according to claim 2, wherein an attribute of the first attribute-value pair is a subscription identity group (Subscription-Id-Group), and an attribute of the second attribute-value pair is subscription identity data (Subscription-Id-Data).

5. The method according to claim 1, wherein the user equipment identifier comprises at least one of a circuit identifier (circuit ID) of the user equipment and a media access control (MAC) address of the user equipment.

6. The method according to claim 1, wherein the authentication, authorization, and accounting request further comprises a password corresponding to the user name, and before the sending a charging policy request to a first server, the method further comprises:
   sending an authentication and authorization request to a second server, wherein the authentication and authorization request comprises the user name and the password; and receiving an authentication and authorization response sent by the second server, wherein the authentication and authorization response comprises a result of authentication and authorization that are performed by the second server based on the user name and the password.

7. A charging policy obtaining apparatus, wherein the apparatus comprises:
   a processor; and
   a non-transitory computer-readable storage medium coupled to the processor and storing programming instructions for execution by the processor, the programming instructions instruct the apparatus to:
   receive an authentication, authorization, and accounting request from a user equipment, wherein the authentication, authorization, and accounting request comprises a user name and a user equipment identifier;
   send a charging policy request to a first server, wherein the charging policy request comprises a first field and a second field, the first field is used to carry the user name, and the second field is used to carry the user equipment identifier; and
   receive a charging policy response sent by the first server, wherein the charging policy response comprises a charging policy corresponding to the user name and the user equipment identifier, and obtain the charging policy from the charging policy response.

8. The apparatus according to claim 7, wherein the charging policy request is a credit control request, the first field is a first attribute-value pair, and the second field is a second attribute-value pair.

9. The apparatus according to claim 8, wherein an attribute of the first attribute-value pair is subscription identity data (Subscription-Id-Data), and an attribute of the second attribute-value pair is a subscription identity group (Subscription-Id-Group).

10. The apparatus according to claim 8, wherein an attribute of the first attribute-value pair is a subscription identity group (Subscription-Id-Group), and an attribute of the second attribute-value pair is subscription identity data (Subscription-Id-Data).

11. The apparatus according to claim 7, wherein the user equipment identifier comprises at least one of a circuit identifier (circuit ID) of the user equipment and a media access control (MAC) address of the user equipment.

12. The apparatus according to claim 7, wherein the authentication, authorization, and accounting request further comprises a password corresponding to the user name, and the programming instructions further instruct the apparatus to:
   send an authentication and authorization request to a second server before the first sending unit sends the charging policy request to the first server, wherein the authentication and authorization request comprises the user name and the password; and
   receive an authentication and authorization response sent by the second server, wherein the authentication and authorization response comprises a result of authentication and authorization that are performed by the second server based on the user name and the password.

* * * * *